United States Patent
Saegusa et al.

(10) Patent No.: US 6,825,140 B2
(45) Date of Patent: Nov. 30, 2004

(54) GLASS PASTE

(75) Inventors: Kunio Saegusa, Yawara-mura (JP); Shinichiro Tanaka, Funabashi (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/832,209

(22) Filed: Apr. 11, 2001

(65) Prior Publication Data

US 2003/0207124 A1 Nov. 6, 2003

(30) Foreign Application Priority Data

Apr. 19, 2000 (JP) ........................................ 2000-117647

(51) Int. Cl.$^7$ .............................. C03C 8/16; C03C 8/20
(52) U.S. Cl. .............................. 501/15; 501/17; 501/20; 501/32; 501/76
(58) Field of Search .............................. 501/15, 17, 20, 501/32, 76

(56) References Cited

U.S. PATENT DOCUMENTS

| | | | | |
|---|---|---|---|---|
| 3,966,449 A | * | 6/1976 | Foster et al. .................... | 65/43 |
| 4,058,387 A | * | 11/1977 | Nofziger ........................ | 65/32 |
| 4,071,881 A | | 1/1978 | Bacher | |
| 5,688,480 A | | 11/1997 | Mohri et al. ................. | 423/263 |
| 5,846,505 A | * | 12/1998 | Saegusa ....................... | 423/263 |
| 5,906,527 A | | 5/1999 | Shaikh et al. | |
| 6,069,099 A | * | 5/2000 | Fewkes et al. ................ | 501/15 |
| 6,168,490 B1 | * | 1/2001 | Hozer et al. .................. | 445/24 |
| 6,207,905 B1 | * | 3/2001 | Taga et al. .................... | 501/32 |
| 6,245,699 B1 | * | 6/2001 | Hudecek et al. .............. | 501/18 |
| 6,248,679 B1 | * | 6/2001 | Bobinski ...................... | 501/15 |
| 6,599,851 B1 | * | 7/2003 | Ryu ........................... | 501/22 |

FOREIGN PATENT DOCUMENTS

| | | |
|---|---|---|
| DE | 0152 443 | 11/1981 |
| EP | 1 065 693 A2 | 1/2001 |
| JP | 07-187612 | 7/1995 |
| JP | 08-321257 | 12/1996 |
| JP | 11-60273 | 3/1999 |
| JP | 11-92171 | 4/1999 |
| JP | 2001-72418 | 3/2001 |
| JP | 2001-72434 | 3/2001 |

OTHER PUBLICATIONS

NASA Tech Briefs, "Enamel for High–Temperature Superalloys", vol. NTN–77, (1976), pp. 0683, no month.

* cited by examiner

*Primary Examiner*—Karl Group
(74) *Attorney, Agent, or Firm*—Sughrue Mion, PLLC

(57) ABSTRACT

A glass paste comprising an inorganic powder, wherein the powder has a refractive index of 2.0 or more, a reflective index at wavelengths of light of 400 nm, 550 nm and 700 nm in a light reflection spectrum of 80% or more, a primary particle size measured by scanning electron microscopy of from 0.1 $\mu$m to 10 $\mu$m, and a BET specific surface area of from 0.1 m$^2$/g to 15 m$^2$/g.

8 Claims, No Drawings

GLASS PASTE

BACKGROUND OF THE INVENTION

1. Field of the Invention

The present invention relates to a glass paste. More particularly, the present invention also relates to a glass paste used for a partition wall and the like formed on a substrate of a plasma display panel (hereinafter, referred to as "PDP").

2. Description of the Related Art

In CRT and color liquid crystal displays, increase in size of screen is difficult, on the other hand, PDP is a flat panel display enabling it, and expected to be used for indicator or as a large screen television in public spaces. PDP has a mechanism in which electric discharge is caused between electrodes in a space partitioned with partition walls and filled with a rare gas, and ultraviolet ray emitted from the generated plasma is converted by a phosphor into visible light, to cause showing images. The partition wall is made of glass, and produced by molding a glass powder and calcining the molded article for densification. Addition of inorganic powders such as alumina, zircon and the like into a glass powder has been conventionally suggested. An object of the addition of these inorganic powders is to keep the molded form of the glass in melt condition in the process of calcination after molding of a partition wall using a glass powder.

If the reflective index of a partition wall molded from a glass powder can be improved, light emitted from a phosphor applied on the surface of the partition wall can be efficiently used for display, and the brightness of a screen can be substantially improved. Conventionally, alumina and zircon are used as inorganic fillers, however, they have insufficient function to reflect light. There is a possibility of improvement in brightness, by using an inorganic powder as a filler in a partition wall glass having higher refractive index than alumina (refractive index: 1.77) and zircon (refractive index: 1.9) and by reflecting at the partition wall, light emitted from a phosphor toward rear side of a panel, toward front side of the panel. Regarding an idea of using titanium oxide having a refractive index of 2.6 as a reflection material, JP-A No. 8-321257, for example, has a disclosure: "For the purpose of introducing light emission of a phosphor effectively to the front side of a panel, it may be more advantageous in a certain case to render the color of a partition wall white. In this case, titania and the like are used as a refractory white pigment". However, titanium oxide (titania) tends to weaken reflection of light from a blue light-emitting phosphor, and is not sufficient as a filler having high reflection function.

Further, JP-A No. 11-60273 discloses an example in which a glass film having a film thickness of 15 $\mu$m obtained by adding a titanium oxide powder to a glass powder and calcining the mixture has reflective index of 70%, 65% and 62%, respectively, at wavelengths of 460 nm, 550 nm and 620 nm. However, in this example, titanium oxide is used as an inorganic filler, and a problem of insufficient reflection of light emitted from a blue light-emitting phosphor is not solved.

For enhancing an ability to reflect light, high refractive index is necessary. A partition wall in PDP is constituted of glass, and if a difference in refractive index is small between the glass and inorganic powder as a filler, an ability to reflect light at the interface of the filler particle in glass matrix decreases, therefore, the refractive index is preferably 2.0 or more which is significantly larger than that of the glass matrix. Though there is no upper limit on refractive index, a refractive index of 2.6 of titania is the highest, among substances which can be usually used industrially. However, in spite of high refractive index, titania shows insufficient reflection of light emitted from a blue light-emitting phosphor. For an inorganic powder suitable as a filler for a glass paste which will become a PDP partition wall, only high value of refractive index is not sufficient, and it is also required that reflective index of light measured in the form of a powder is high, and reflective index is high at red, blue and green lights having specific wavelengths, namely, at from 400 nm which is a wavelength near the lower limit on shorter wavelength side of visible light to 700 nm which is a wavelength near the upper limit on longer wavelength side of visible light.

SUMMARY OF THE INVENTION

An object of the present invention is to provide a glass paste having high function to reflect light, obtained by adding an inorganic powder to a glass material, which is used for a partition wall and the like formed on a substrate of PDP.

The present inventors have found that a glass paste comprising an inorganic powder having a refractive index of not less than a specific value, having high reflective index at red, blue and green light having specific wavelengths, and having a particle size within a specific range, is suitable for a PDP partition wall.

Namely, the present invention provides a glass paste comprising an inorganic powder, wherein the powder has a refractive index of 2.0 or more, reflective index at wavelengths of light of 400 nm, 550 nm and 700 nm in a light reflection spectrum of 80% or more, the primary particle size measured by scanning electron microscopy (SEM) of from 0.1 $\mu$m to 10 $\mu$m, and the BET specific surface area of from 0.1 m$^2$/g to 15 m2/g.

DETAILED DESCRIPTION OF THE PREFERRED EMBODIMENTS

The present invention will be illustrated in detail below.

In the present invention, the refractive index of an inorganic powder to be compounded into a glass paste which will become a PDP partition wall is 2.0 or more, and the reflective index of light of this powder is measured by molding this powder into a plate or compacting this powder by utilizing a holder for measuring X-ray diffraction to give a flat surface, and using a reflection spectrum measuring apparatus equipped with an integrating sphere.

In the present invention, the range of the wavelength of light for measuring a reflection spectrum is a range of visible light and is from 400 nm which is a wavelength near the lower limit on shorter wavelength side of visible light to 700 nm which is a wavelength near the upper limit on longer wavelength side of visible light. Namely, the range include 400 nm which is a wavelength near the lower limit on shorter wavelength side of visible light, 700 nm which is a wavelength near the upper limit on longer wavelength side of visible light, and 550 nm which is an intermediate wavelength corresponding to green, and when the reflective indexes at these wavelengths are all 80% or more, an inorganic powder is used as a filler for a glass paste which will become a PDP partition wall having high reflection function. It is preferable that the values of reflective index are 90% or more in respective cases. Since it is preferable that absorption is low and reflective index is high also at wavelengths between 400 nm, 550 nm and 700 nm, reflective index at wavelengths at 500 nm and 600 nm is 80% or more, and preferably 90% or more.

Since the inorganic powder of the present invention is used as a filler to be added to a glass paste which is a material used for producing a PDP partition wall, it is necessary that this powder can be mixed suitably with a glass powder as a material of a PDP partition wall. For mixing with a glass powder, the primary particle size measured by SEM is suitably in the range from 0.1 $\mu$m to 10 $\mu$m, preferably in the range from 0.3 $\mu$m to 5 $\mu$m, giving not so big difference in particle size from the glass powder. When the primary particle size is less than 0.1 $\mu$m or more than 10 $\mu$m, mixing with the glass powder can not be conducted appropriately.

The BET specific surface area is from 0.1 $m^2$/g to 15 m2/g, preferably from 1 $m^2$/g to 10 $m^2$/g. When the BET specific surface area is less than 0.1 $m^2$/g or more than 15 $m^2$/g, mixing with a glass powder cannot be conducted appropriately.

It is preferable that an inorganic powder used in a glass paste used as a material of a PDP partition wall contains agglomerated particles in small amount, and a ratio of the primary particle size measured by SEM to a primary particle size calculated from the BET specific surface area is preferably from 0.1 to 5, more preferably from 0.1 to 3, further preferably from 0.5 to 1.5.

The primary particle size to be calculated from the BET specific surface area is calculated according to the formula: 6 (constant)÷(theoretical density of inorganic powder, unit: g/$cm^3$)÷BET specific surface area (m2/g). When a content of agglomerated particles is high, particle size calculated is larger due to decreased surface area since surfaces of particles are connected mutually, and resultantly, a ratio of the primary particle size measured by SEM to a primary particle size calculated from the BET specific surface area decreases, therefore, the ratio is preferably 0.1 or more, further preferably 0.5 or more. An agglomerated particle is a cause of a defect in a partition wall when the partition wall is formed. On the other hand, when the form of a particle is amorphous, the surface contains a lot of defects and significantly uneven, then, the BET specific surface area increases, consequently, a primary particle size calculated from the BET specific surface area decreases, and a ratio of the primary particle size measured by SEM to a primary particle size calculated from the BET specific surface area increases, and the ratio is preferably 5 or less, more preferably 3 or less, further preferably 1.5 or less. When the surface of a particle has a lot of defects and significantly uneven, an effect to reflect light is not manifested sufficiently.

As the inorganic powder of the present invention, a powder of a metal oxide satisfying the above-mentioned conditions may be advantageous, and for example, a magnesium titanate powder, zirconia powder and the like are listed.

The refractive index of magnesium titanate is 2.3, and is larger than 2.0 of zirconia, therefore, magnesium titanate is more preferable.

A magnesium titanate powder can be produced, for example, as follows.

As the titanium sources, a powder obtained by drying a metatitanic acid slurry generated in a process of producing titanium oxide according to a sulfuric acid method, a powder of a titanium compound which can be converted into titanium oxide by heating, such as orthotitanic acid and the like generated by hydrolysis or neutralization of a titanium tetrachloride aqueous solution, or a powder of titanium oxide, can be used. As the magnesium sources, magnesium compounds which can be converted into magnesium oxide by heating, such as magnesium hydroxide, magnesium carbonate and the like, or magnesium oxide can be used.

The titanium source and the magnesium source are mixed to produce a mixed raw material for calcination. The mixing can be conducted by a dry ball mill or a wet ball mill using water, isopropyl alcohol and the like. Alternatively, the mixing can be conducted by mixing methods usually used industrially such as a vibration mill, fractioner, attrition mill, Henschel mixer and the like.

By calcination of the mixed raw material in air at temperatures from 800 to 1200° C., magnesium titanate is produced. Further, the mixed raw material can also be calcined in an atmosphere containing hydrogen chloride, chlorine, or chlorine and water vapor, preferably at temperatures from 600 to 1200° C., more preferably from 700 to 1100° C., for 10 minutes to 6 hours, to obtain a powder (particle) of magnesium titanate.

The zirconia used in the present invention can be produced in the same manner as for the above-mentioned magnesium titanate powder, using, for example, zirconium oxychloride as a raw material.

For the calcination, a batch-wise calcination furnace, tunnel furnace and rotary kiln which are industrially used can be used, and when hydrogen chloride and chlorine are used, a furnace which can control a gas atmosphere is desirable.

Regarding particle form, a polyhedral form having substantially no fractured surface is preferable than sphere form since the polyhedral form is more suitable for reflection and scattering. The particle having polyhedral form is realized by a particle composed of a single crystal of an inorganic substance. By using a single crystal particle, a crystal surface derived from sequence of atoms appears on the surface of the particle, polyhedral form is given to the particle. In a crystal structure based on form of cube or rectangular parallelepiped, the number of surfaces is 6 or more, and in the case of a crystal structure based on the form of hexagonal prism, the number of surfaces is 8 or more. When the number of surfaces is over 30, the form approximates sphere, and reflection of light does not differ from that of a spherical particle.

The glass paste for a PDP partition wall using the inorganic filler to be compounded into a glass paste of the present invention can be produced, for example, according to a known method as disclosed in JP-A No. 11-92171, by mixing binder, solvent, glass powder having lower glass transition temperature and inorganic filler. As the binder, for example, cellulose-based resins such as ethyl cellulose, hydroxyethylcellulose, nitro cellulose and the like, acrylic resins such as polybutyl acrylate, polyisobutyl methacrylate and the like, and polymer compounds such as polyvinyl alcohol-based resin and the like, are listed. As the solvent, solvents having lower boiling point such as acetone, isopropyl alcohol, and solvents having higher boiling point such as butyl cellosolve acetate, butyl carbitol acetate, naphtha, mineral terpene, are listed. Further, plasticizers such as dibutyl phthalate, dioctyl phthalate and the like, or dispersing agents, lubricants and the like can also be added to the glass paste.

The glass paste of the present invention can be used for production of partition walls in the form of stripe or in the form of waffle on an AC type plasma display panel, formation of partition walls having cell structure of DC type, and the like.

According to the present invention, a glass paste comprising an inorganic powder is used for forming a partition wall on a plasma display panel (PDP).

EXAMPLE

Examples of the present invention will be shown below, but do not limit the scope of the present invention.

Various measurements in the present invention were conducted as follows.

1. Reflection Spectrum

A powder was placed by being compacted into a sample holder for X-ray diffraction having a concave of 0.5 mm depth, and reflection spectrum of the surface on which the powder was exposed was measured by a spectrophotometer, CM2002 type, manufactured by Minolta Co. Ltd.

2. Primary Particle Size Measured by SEM

The powder was photographed using SEM (scanning electron microscope, T-220 manufactured by JEOL Ltd.), and 5 to 10 particles were selected in the photograph and sizes thereof were measured, and the average was calculated.

3. BET Specific Surface Area

It was measured according to a BET one point method using Flow Sorb II2300 type, manufactured by Micromeritics Instrument Co.

4. Phase Identification by X-ray Diffraction Pattern

An X-ray diffraction pattern was measured using RU-200 manufactured by Rigaku K. K., under conditions of 40 kV-30 mA in the range from 10 to 70°, and a phase was judged from the results.

Reference Example 1

462 g of anatase type titanium oxide, A-100 (trade name) manufactured by Ishihara Sangyo K. K. and 344 g of magnesium hydroxide, 200-06H (trade name), manufactured by Kyowa Kagaku Kogyo K. K. were weighed and charged into a polyethylene vessel having a volume of 10 L. 9.7 kg of plastic balls containing an iron core having a diameter of 15 mm were added into this vessel, and ball mill mixing was conducted under dry condition for 2 hours. The resulted mixture was calcined at 1100° C. for 1 hour, and the resulted powder was ground at an air pressure of 0.6 MPa (6 kg/cm$^2$) using a jet mill, PJM-100 SP type, manufactured by Nippon Pneumatic Kogyo K. K. The resulted powder was identified as a magnesium titanate powder as a result of X-ray diffraction.

Example 1

The resulted magnesium titanate powder had a BET specific surface area of 3.7 m$^2$/g, and an average primary particle size measured by SEM of 0.4 μm. The particle size calculated from the BET specific surface area was 0.4 μm, and (primary particle size measured by SEM)/(primary particle size calculated from BET specific surface area) was 1.0. The reflection spectrum of the resulted magnesium titanate powder was measured to find reflective indexes at 400 nm, 500 nm, 550 nm, 600 nm and 700 nm of 92.0%, 95.8%, 96.5%, 96.8% and 97.1%, respectively.

Further, this powder was added to glass powder having lower glass transition temperature, and reflection spectrum thereof was measured. 2.0 g of the above-mentioned magnesium titanate powder was added to 8.0 g of ASF-1340 (trade name) manufactured by Asahi Glass Co., Ltd. which is a glass powder having a glass transition temperature of 420° C., and mixed under dry condition by ball mill treatment for 1 hour. The chemical composition of ASF-1340 used is:

PbO 70 wt %
B$_2$O$_3$ 10 wt %
SiO$_2$ 10 wt %
ZnO 10 wt %.

About 2 g of the resulted powder was molded into a pallet by a uni-axial press at a pressure of 60 MPa (600 kg/cm$^2$) using a mold having an internal diameter of 13 mm. The molded article was placed into a furnace, and calcined for 20 minutes at a temperature of 600° C. in an air atmosphere at a temperature raising rate of 5° C./min. The reflection spectrum of thus obtained calcined substance in the form of a pellet was measured. Reflective indexes at 400 nm, 500 nm, 550 nm, 600 nm and 700 nm were 68.0%, 85.4%, 86.9%, 88.5% and 91.5%, respectively, indicating that high reflective index can also be realized in the wavelength range from 400 to 700 nm even in the case of addition of glass.

Reference Example 2

462 g of anatase type titanium oxide, A-100 (trade name) manufactured by Ishihara Sangyo K. K. and 344 g of magnesium hydroxide, 200-06H (trade name), manufactured by Kyowa Kagaku Kogyo K. K. were weighed and charged into a polyethylene vessel having a volume of 10 L. 9.7 kg of plastic balls containing an iron core having a diameter of 15 mm were added into this vessel, and ball mill mixing was conducted under dry condition for 2 hours. The resulted mixture was calcined at 800° C. for 30 minutes while flowing the atmosphere gas consisting of 30 vol. % of hydrogen chloride and 70 vol. % of nitrogen at a linear velocity of 150 mm/min. The resulted powder was ground at an air pressure of 0.6 MPa (6 kg/cm$^2$) using a jet mill, PJM-100 SP type, manufactured by Nippon Pneumatic Kogyo K. K. The resulted powder was identified as a magnesium titanate powder as a result of X-ray diffraction.

Example 2

The resulted magnesium titanate powder had a BET specific surface area of 7.5 m$^2$/g, and an average primary particle size measured by SEM of 0.2 μm. The particle size calculated from the BET specific surface area was 0.2 μm, and (primary particle size measured by SEM)/(primary particle size calculated from BET specific surface area) was 1.0. The reflection spectrum of the resulted magnesium titanate powder was measured to find reflective indexes at 400 nm, 500 nm, 550 nm, 600 nm and 700 nm of 92.7%, 96.4%, 96.9%, 97.8% and 97.5%, respectively.

Further, this powder was added to glass powder having lower glass transition temperature, and reflection spectrum thereof was measured. 2.0 g of the above-mentioned magnesium titanate powder was added to 8.0 g of ASF-1340 (trade name) manufactured by Asahi Glass Co., Ltd. which is a glass powder having a glass transition temperature of 420° C., and mixed under dry condition by ball mill treatment for 1 hour. The chemical composition of ASF-1340 used is:

PbO 70 wt %
B$_2$O$_3$ 10 wt %
SiO$_2$ 10 wt %
ZnO 10 wt %.

About 2 g of the resulted powder was molded into a pallet by a uni-axial press at a pressure of 60 MPa (600 kg/cm$^2$) using a mold having an internal diameter of 13 mm. The molded article was placed into a furnace, and calcined for 20 minutes at a temperature of 600° C. in an air reflection spectrum of thus obtained calcined substance in the form of a pellet was measured. Reflective indexes at 400 nm, 500 nm, 550 nm, 600 nm and 700 nm were 68.2%, 86.5%, 87.5%, 89.5% and 92.7%, respectively, indicating that high reflective index can also be realized in the wavelength range from 400 to 700 nm even in the case of addition of glass.

Reference Example 3

462 g of anatase type titanium oxide, A-100 (trade name) manufactured by Ishihara Sangyo K. K. and 344 g of magnesium hydroxide, 200-06H (trade name), manufactured by Kyowa Kagaku Kogyo K.K. were weighed and charged into a polyethylene vessel having a volume of 10 L. 9.7 kg of plastic balls containing an iron core having a diameter of 15 mm were added into this vessel, and ball mill mixing was conducted under dry condition for 20 hours. The resulted mixture was calcined at 800° C. for 30 minutes while flowing the atmosphere gas consisting of 10 vol. % of hydrogen chloride and 90 vol. % of nitrogen at a linear velocity of 150 mm/min. Two times weight of ion-exchanged water was added to 350 g of the resulted powder and they were ground by a wet ball milling, which used a polyethylene vessel having a volume of 2 L. 4.0 kg of alumina balls having a diameter of 5 mm were added into this vessel, and ball milling was conducted under wet condition for 20 hours. The resulted slurry was dried at 120° C. for 48 hours and was ground by a dry ball milling, which used a polyethylene vessel having a volume of 2 L. 2.7 kg of plastic balls containing an iron core having a diameter of 15 mm were added into this vessel, and ball milling was conducted under dry condition for 4 hours. The resulted powder was identified as a magnesium titanate powder as a result of X-ray diffraction.

Example 3

The resulted magnesium titanate powder had a BET specific surface area of 11.0 m$^2$/g, and an average primary particle size measured by SEM of 0.2 µm. The particle size calculated from the BET specific surface area was 0.14 µm, and (primary particle size measured by SEM)/(primary particle size calculated from BET specific surface area) was 1.4. The reflection spectrum of the resulted magnesium titanate powder was measured to find reflective indexes at 400 nm, 500 nm, 550 nm, 600 nm and 700 nm of 93.7%, 96.6%, 96.9%, 97.5% and 97.4%, respectively.

Further, this powder was added to glass powder having lower glass transition temperature, and reflection spectrum thereof was measured. 2.0 g of the above-mentioned magnesium titanate powder was added to 8.0 g of ASF-1340 (trade name) manufactured by Asahi Glass Co., Ltd. which is a glass powder having a glass transition temperature of 420° C., and mixed under dry condition by ball mill treatment for 1 hour. The chemical composition of ASF-1340 used is:

PbO 70 wt %
B$_2$O$_3$ 10 wt %
SiO$_2$ 10 wt %
ZnO 10 wt %.

About 2 g of the resulted powder was molded into a pallet by a uni-axial press at a pressure of 60 MPa (600 kg/cm$^2$) using a mold having an internal diameter of 13 mm. The molded article was placed into a furnace, and calcined for 20 minutes at a temperature of 600° C. in an air reflection spectrum of thus obtained calcined substance in the form of a pellet was measured. Reflective indexes at 400 nm, 500 nm, 550 nm, 600 nm and 700 nm were 69.7%, 87.4%, 87.7%, 89.4% and 91.6%, respectively, indicating that high reflective index can also be realized in the wavelength range from 400 to 700 nm even in the case of addition of glass.

Comparative Example 1

The reflection spectrum of rutile type titanium oxide, CR-EL (trade name) manufactured by Ishihara Sangyo K.K. was measured to find reflective indexes at 400 nm, 500 nm, 550 nm, 600 nm and 700 nm of 44.5%, 93.3%, 94.1%, 94.5% and 95.4%, respectively. Namely, the reflective index at a wavelength of 400 nm was particularly low. The powder had a BET specific surface area of 6.8 m$^2$/g, and a particle size measured by SEM of 0.21 µm. The particle size calculated from the BET specific surface area was 0.21 µm, and (primary particle size measured by SEM)/(primary particle size calculated from BET specific surface area) was 1.0.

Further, 2.0 g of this titanium oxide powder was added to 8.0 g of ASF-1340 (trade name) manufactured by Asahi Glass Co., Ltd. which is a glass powder having a glass transition temperature of 420° C., and mixed under dry condition by ball mill treatment for 1 hour. The chemical composition of ASF-1340 used is:

PbO 70 wt %
B$_2$O$_3$ 10 wt %
SiO$_2$ 10 wt %
ZnO 10 wt %.

About 2 g of the resulted powder was molded into a pallet by a uni-axial press at a pressure of 60 MPa (600 kg/cm2) using a mold having an internal diameter of 13 mm. The molded article was placed into a furnace, and calcined for 20 minutes at a temperature of 600° C. in an air atmosphere at a temperature raising rate of 5° C./min. The reflection spectrum of thus obtained calcined substance in the form of a pellet was measured. Reflective indexes at 400 nm, 500 nm, 550 nm, 600 nm and 700 nm were 30.4%, 80.8%, 83.2%, 84.9% and 87.1%, respectively, and the reflective index at a wavelength of 400 nm was low, corresponding to the tendency of the measured results when a powder was only used.

As described above, though titanium oxide (titania) has a refractive index of as high as 2.6, reflective index at 400 nm of the powder is as low as less than 50%, teaching that the powder is not sufficient as a filler having high reflection function to be added to a glass paste, which is a material of a PDP partition wall, of the present invention. Namely, When titanium oxide is used as a glass filler, reduction in reflective index particularly at 400 nm is problematical, however, by mixing the inorganic powder of the present invention as a filler to a glass powder, and molding and calcining the mixture, the glass material containing the filler can get high reflective indexes, namely, 60% or more even at 400 nm, and 80% or more at from 500 to 700 nm.

What is claimed is:

1. A glass paste comprising a magnesium titanate powder and a glass powder having a glass transition temperature of 500° C. or less, wherein the magnesium titanate powder has a refractive index of 2.0 or more, a reflective index at wavelengths of light of 400 nm, 550 nm and 700 nm in a light reflection spectrum of 80% or more, a primary particle size measured by scanning electron microscopy of from 0.1 µm to 10 µm, and a BET specific surface area of from 0.1 m$^2$/g to 15 m$^2$/g.

2. A glass paste comprising a magnesium titanate powder and a glass powder having a glass transition temperature of 500° C. or less, wherein the magnesium titanate powder has a refractive index of 2.0 or more, a reflective index at wavelengths of light of 400 nm, 550 nm and 700 nm in a light reflection spectrum of 80% or more, a primary particle size measured by scanning electron microscopy of from 0.1 $\mu$m to 10 $\mu$m, and a BET specific surface area of from 0.1 $m^2/g$ to 10 $m^2/g$.

3. The glass paste according to claim 1, wherein a ratio of the primary particle size by scanning electron microscopy of the magnesium titanate powder to a primary particle size calculated from the BET specific surface area is from 0.1 to 5.

4. The glass paste according to claim 2, wherein a ratio of the primary particle size by scanning electron microscopy of the magnesium titanate powder to a primary particle size calculated from the BET specific surface area is from 0.1 to 5.

5. The glass paste according to claim 1, wherein the magnesium titanate powder comprises a polyhedral particle having substantially no fractured surface.

6. The glass paste according to claim 2, wherein the magnesium titanate powder comprises a polyhedral particle having substantially no fractured surface.

7. A glass paste obtained by mixing an organic substance into a composition obtained by compounding a magnesium titanate powder according to claim 1 in an amount of 1% by weight to 80% by weight with a glass powder having a glass transition temperature of 500° C. or less.

8. A glass paste obtained by mixing an organic substance into a composition obtained by compounding a magnesium titanate powder according to claim 2 in an amount of 1% by weight to 80% by weight with a glass powder having a glass transition temperature of 500° C. or less.

* * * * *